Jan. 11, 1966   L. F. SMREKAR   3,228,706
COLLET-ACTUATING MECHANISM
Filed April 21, 1964
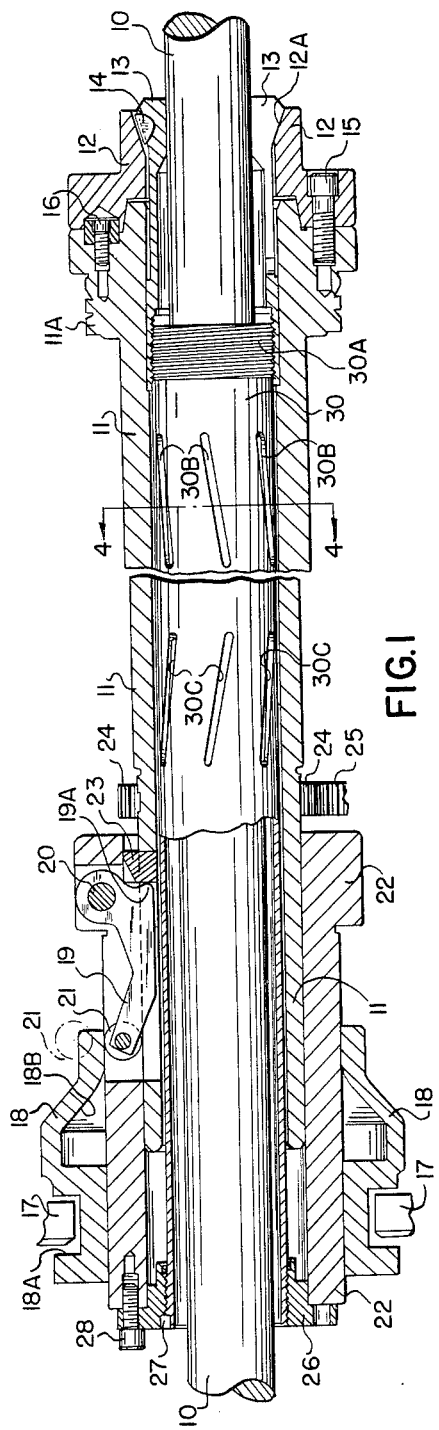
FIG. 1
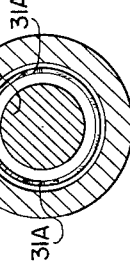
FIG. 4
FIG. 3
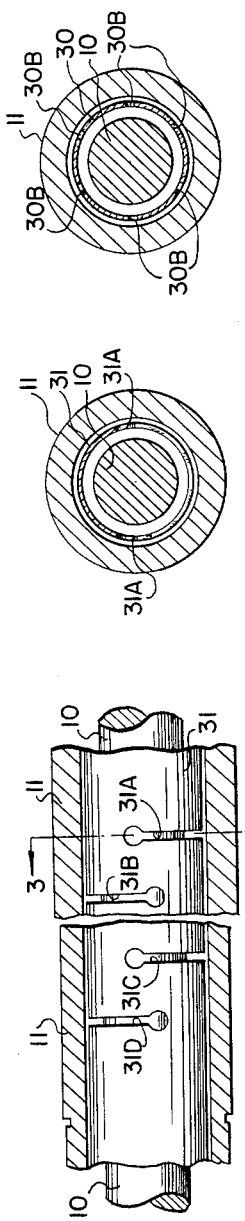
FIG. 2
INVENTOR.
LARRY F. SMREKAR
BY
ATTORNEYS

United States Patent Office 3,228,706
Patented Jan. 11, 1966

3,228,706
COLLET-ACTUATING MECHANISM
Larry F. Smrekar, 6604 Solon Blvd., Solon, Ohio 44139
Filed Apr. 21, 1964, Ser. No. 361,449
8 Claims. (Cl. 279—1)

My invention relates to collet-actuating mechanisms wherein stock-engaging collet fingers or pads are actuated relative to the stock by a reciprocal tube within a spindle.

An object of my invention is to provide an improved mechanism of the class obviating shortcomings and disadvantages of the prior devices.

Another object is the provision of a collet-actuating mechanism having a reciprocal tube for actuating the collet device and which tube is constructed to accommodate for variations and irregularities in the stock being fed axially through the spindle.

Another object is the provision of an improved construction in a tube for actuating the collet device carried by a rotatable spindle, which tube is so constructed as to take or absorb shocks within itself and without the need for external or supplemental springs in the operation of the mechanism.

Another object is the provision for providing longitudinal resiliency to a tube which reciprocally moves collet fingers or pads within a rotatable spindle.

Another object is the provision for an improved structure of such a collet-actuating mechanism which is directed to the absorption of shocks in the mechanism upon reciprocation of the collet-actuating tube and which also is directed to accommodating the mechanism to variations and irregularities in the stock or material being held by the collet device and axially fed therethrough.

Another object is the provision of a collet-tube compensator providing improved results in an ingenious and novel manner.

Other objects and a fuller understanding of the invention may be had by referring to the following description and claims, taken in conjunction with the accompanying drawings, in which:

FIGURE 1 is a longitudinal sectional view of my improved collet-actuating mechanism;

FIGURE 2 is a partial longitudinal sectional view of my mechanism having a modified form of collet-actuating tube therein as distinct from the form of collet-actuating tube illustration in FIGURE 1;

FIGURE 3 is a cross-sectional view taken through the line 3—3 of FIGURE 2; and

FIGURE 4 is a cross-sectional view taken through the line 4—4 of FIGURE 1.

The present invention is directed to a rotatable hollow spindle for a machine tool. One type of hollow spindle of the general class but having other mechanisms applied thereto is shown in my United States Patent No. 3,125,913, issued March 24, 1964, the reference to that patent being for the purpose of indicating the broad general class to which this invention relates.

In the drawings, round stock 10, such as steel bar stock, is fed into a machine tool by the collet carried on the end of a rotatable spindle. The rotatable spindle illustrated is denoted by the reference character 11. This rotatable spindle 11 has a cylindrical bore extending therethrough and its forward end is enlarged to provide the enlarged end portion 11A. Secured by screw bolts 15 and 16 is a collet head 12. This collet head 12 has an inclined camming surface 12A which cooperates in the usual manner with the external sloping walls of collet pads or fingers 13. There are a plurality, such as three or four, of collet pads or fingers 13 arranged around the axis of the device in such manner that the external sloping surface of the collet pads or fingers is in camming engagement with the inner inclined wall 12A of the head 12. A key 14 carried by the head 12 prevents revolving of the collet pads or fingers relative to the head 12.

My invention is directed to actuating collets which move in and out of gripping engagement with stock by reciprocal movement of the collets and also applies to other arrangements wherein the inner engaged camming surfaces are reversed from the arrangement illustrated.

The spindle 11 is rotated on its axis by any suitable means, such as by a ring gear 24 splined to the spindle 11, which gear 24 in turn is rotated by a driving gear 25 shown fragmentarily in FIGURE 1.

Concentrically mounted within the bore of the spindle 11 is my improved collet-actuating tube 30 which also has a hollow bore extending therethrough, the stock 10 extending through the bore of the tube 30. The forward end of the actuating tube 30 has a threaded end portion 30A which, in turn, is threadably engaged to the rearward ends of the plurality of collet pads or fingers 13 so that reciprocation of the tube 30 also reciprocates the pads or fingers 13 and thus moves them relative to the head 12.

The rearward end of the tube 30 is threadably engaged to a flange member 26. A key 27 prevents rotation of the tube 30 relative to the flange member 26 and thus prevents unthreading of their threaded engagement. The flange member 26, in turn, is secured to a chucking finger housing 22 by a plurality of screw bolts 28. Thus the housing 22 is interconnected with the tube 30 through the flange 26 so that the housing 22 and tube 30 reciprocate together.

Concentrically mounted upon the housing 22 is a spool member 18 which moves in an axial direction along the outer cylindrical wall of the housing 22 in the reciprocal movement of the tube 30. This spool member 18 has an annular groove 18A extending therearound and a forked arm 17 of a yoke is positioned within the groove 18A. Swinging of the forked arm 17 within the groove 18A causes interengagement of the forked arm 17 with sides of the groove 18A and thus causes reciprocation of the spool member 18 in an axial direction in the usual manner.

Carried by the housing 22 and disposed in slots for accommodating the same are three chucking fingers 19, each being carried on a respective pivot pin 20. Mounted on the other end of each chucking finger 19 is a finger roll 21. These three finger rolls 21 are arranged to ride on and along the internal camming surface 18B within the spool member 18. The axial position of the spool member 18 relative to the housing 22 determines the radial location of the three rolls 21 carried on the respective chucking fingers 19, and hence the angular disposition of the chucking fingers 19 as they swing on their respective pivot pins 20. Each chucking finger 19 has a nose portion 19A which abuts against an abutting member 23 which, in turn, is secured to the spindle 11. The nose portions 19A of the finger members 19 bear against the abutting members 23 and thus against the spindle 11. It will be understood that the chucking finger mechanism illustrated in FIGURE 1 is repeated so that there are three such chucking finger mechanisms located equidistantly around the circumference of the spindle. As the housing 22 is secured to the tube 30, it is seen that the actuation of the chucking fingers 19 through the reciprocal movement of the spool member 18 causes reciprocation of the tube 30 by the swinging back and forth of the forked arm 17 within the groove 18A of the spool member 18. The arrangement permits the rotation of the spool member 18 relative to the non-rotating forked arm 17.

My actuating tube 30 is specially constructed to accommodate variations and irregularities in the stock, such as stock 10. As the distance between the rear end of the tube 30 and the collet head 12 on the forward end of the spindle is fixed, an increase in the diameter of the stock 10 over that for which the mechanism is designed causes the collet pad members 13 to strike the exterior of the stock 10 before the collet fingers reach their full seated position within the head 12. This causes a severe strain and tendency toward elongating of the tube 30. Also shocks are imposed upon the tube 30 by other variations and irregularities in the external contour or surface of the stock 10. I provide for accommodating the mechanism to these conditions by so constructing the tube 30 as to give it resiliency in a longitudinal direction. In the form of the invention illustrated in FIGURES 1 and 4, there are formed or cut through the cylindrical wall of the tube 30, six spirally disposed slots 30B near the forward end of the tube 30 and six spirally disposed slots 30C rearwardly therefrom. The slots 30B are equidistantly spaced around the circumference of the tube 30 and also the slots 30C are equidistantly spaced around the circumference of the tube 30. As seen in FIGURE 1, the angular disposition of the slots 30C are in an opposite direction from that of the slots 30B.

It is seen that by the provision of the slots 30B and 30C as illustrated and described, the tube 30 is given resiliency. The material of the tube 30 is preferably made of a tempered steel which gives the tube a spring action when so slotted. The tube may be somewhat resiliently compressed in a longitudinal direction and also may be somewhat resiliently extended in a longitudinal direction. The resiliency of the tube 30 in a longitudinal direction provides for accommodation of the mechanism to variations and irregularities in the stock and to any wear on the collet parts or to any change from the initial adjustment of the parts. Shocks are absorbed and breakage of the parts is minimized. It is further found possible to avoid or eliminate the use of supplemental or extraneous springs through the use of this improvement.

A modified form of collet-actuating tube is illustrated in FIGURES 2 and 3. Here the tube is denoted generally by the reference character 31 and has a plurality of transverse slots cut therethrough at spaced locations along the length of the tube 31. In the illustration shown, there are four transverse slots 31A, 31B, 31C and 31D. It is to be noted that the slots extend across more than half of the diameter of the tube 31 so that the opposite ends of each slot are in a plane which is in a plane beyond and parallel to a plane extending axially of the tube 31. By such transverse slots and the described arrangement, the tube 31, being of appropriate tempered steel, is given the character of resiliency so as to resiliently compress and expand in a longitudinal direction. Such a tube 31 provides similar results as those provided by the tube 30 described in connection with FIGURES 1 and 4.

Those familiar with the problems and shortcomings of prior collet-actuating mechanisms will appreciate and recognize the advantages and benefits accruing through the use of the herein described invention.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. Improved operating collet mechanism comprising the combination of a rotatable spindle member, a collet head carried thereby, a plurality of collet pad members disposed around the axis of the collet head cooperative with said collet head for moving the pad members radially relative to stock extending axially thereof for gripping the same, an actuating tube member extending within said spindle and axially thereof, said tube member having a forward portion and a rearward portion and being rotatable with said spindle member, the forward end portion of said tube member being connected to said pad members for actuating the same upon reciprocation of the tube member, and means connected to the rearward end portion of the tube member for cyclically reciprocating the tube member in an axial direction relative to the said spindle member, reciprocal movement of the tube member reciprocating said pad members relative to said collet head to actuate the pad members, said tube member being slotted transversely of planes extending through the axis of the tube member and being of resiliently yieldable metal to impart longitudinal resiliency to the tube member, said tubular member resiliently yielding to axially directed force imposed thereon by variations in the axial distance between the location of rearward end portion of the tube member and the location of the pad members connected to the forward end portion of the tube member resulting from variations in the diameter of the stock gripped by the pad members upon inward radial movement of the pad members.

2. A collet-operating tube member for a rotatable spindle of a machine tool, a collet carried at the forward end of the spindle, said tube member being axially reciprocal relative to the spindle for operating the collet carried thereby, actuating means connected to a rearward portion of the tube member for reciprocating the same, said tube member being resiliently yieldable in an axial direction to absorb shocks and strains imposed thereon in an axial direction upon operation of the collet by reciprocation of the tube member, said tube member being of resilient metal and having a plurality of slots cut through the wall thereof at a plurality of locations along its length and disposed transversely of planes extending along the axis thereof, the tube member upon receiving longitudinally directed shocks and strains imposed thereon in reciprocation and variation in operation of the collet resiliently yielding thereto.

3. A collet-operating tube member as claimed in claim 2 and in which said plurality of slots are each spirally disposed along the tube member and are spaced from each other longitudinally and circumferentially.

4. A collet-operating tube member as claimed in claim 2 and in which said slots are arranged in a plurality of groups, each group being spaced axially from the next adjacent group, in which the slots of each group are equidistantly arranged around the tube member, and in which the slots of each group are inclined in opposite directions to the slots of the next adjacent group.

5. A collet-operating tube member as claimed in claim 2 and in which said slots are cut through the tube in planes normal to planes extending axially of the tube member and extend from a side of the tube member beyond said axially extending planes, the wall of the tube member along its longitudinal extent being interrupted by at least one of said slots.

6. Means for compensating for variations in the diameter of stock being gripped by the collet pad members carried by the forward end portion of a rotatable spindle of a machine tool and resultant variation in the axial distance between the pad members in gripping position and actuating means carried by the spindle at a location axially spaced rearwardly of the pad members, comprising a hollow elongated member interconnecting said pad members and actuating means whereby the pad members at said forward end portion are reciprocated in an axial direction to gripping and ungripping position by the elongated member reciprocated at said rearward location by said actuating means, said elongated member intermediate said pad members and said rearward location being resilient metal formed into circumferentially separated elongate positions transversely disposed to planes coinciding with the axis of the elongated member and winding about the axis of the elongated member to provide a coil spring effect accommodating axially directed compression and extension imposed on the elongated member, said elongated member absorbing compressive and extending forces imposed thereon in compensating for said variations in said distances between the pad members and actuating means.

7. A tube extending through a spindle for connecting collet pad members carried by the spindle adjacent one end of the spindle and connected to the tube adjacent its forward end and reciprocal actuating means carried by the spindle adjacent an opposite end of the spindle and connected to the tube adjacent its rearward end, said tube being of resilient steel and having a plurality of slots therethrough spaced axially of the tube and extending circumferentially thereof for over half the circumference of the tube, the tube resiliently yielding to compensate for variations in the effective spacing between said collet pad members and said actuating means resulting from variations in the reaction between the collect pad members and stock gripped thereby.

8. A tube extending through a spindle for connecting collet pad members carried by the spindle adjacent one end of the spindle and connected to the tube adjacent its forward end and reciprocal actuating means carried by the spindle adjacent an opposite end of the spindle and connected to the tube adjacent its rearward end, said tube being of resilient steel and having a plurality of spirally disposed slots therethrough and arranged substantially equidistantly about the tube, reciprocal pull on the said rearward end of the tube by said actuating means moving said collect pads radially inward by camming action adjacent said one end of the spindle, the tube resiliently yielding to compensate for variations in the effective spacing between said collet pad members and said actuating means resulting from variations in the reaction between the collet pad members and stock gripped thereby.

References Cited by the Examiner

UNITED STATES PATENTS

| | | | |
|---|---|---|---|
| 728,572 | 5/1903 | Hanson | 279—1.4 |
| 1,542,428 | 6/1925 | Watrous | 279—1 |
| 1,848,317 | 3/1932 | Church | 279—119 |
| 1,979,367 | 11/1934 | Cone | 279—1.4 |
| 2,610,066 | 9/1952 | Pigott | 279—51 |
| 2,833,545 | 5/1958 | Smrekar | 279—47 |

LESTER M. SWINGLE, *Primary Examiner.*

ROBERT C. RIORDON, *Examiner.*

H. V. STAHLHUTH, *Assistant Examiner.*